United States Patent
Knudsen et al.

(10) Patent No.: US 10,439,240 B2
(45) Date of Patent: Oct. 8, 2019

(54) SYSTEM AND METHOD FOR MINIMIZING TRANSPORT RELATED PERFORMANCE LOSSES IN A FLOW BATTERY SYSTEM

(71) Applicants: Robert Bosch GmbH, Stuttgart (DE); Edward Knudsen, Menlo Park, CA (US); Paul Albertus, Washington, DC (US)

(72) Inventors: Edward Knudsen, Menlo Park, CA (US); Paul Albertus, Washington, DC (US)

(73) Assignee: Robert Bosch GmbH, Stuttgart (DE)

(*) Notice: Subject to any disclaimer, the term of this patent is extended or adjusted under 35 U.S.C. 154(b) by 441 days.

(21) Appl. No.: 15/037,828

(22) PCT Filed: Nov. 21, 2014

(86) PCT No.: PCT/US2014/066866
§ 371 (c)(1),
(2) Date: May 19, 2016

(87) PCT Pub. No.: WO2015/077589
PCT Pub. Date: May 28, 2015

(65) Prior Publication Data
US 2016/0293982 A1     Oct. 6, 2016

Related U.S. Application Data

(60) Provisional application No. 61/906,999, filed on Nov. 21, 2013.

(51) Int. Cl.
*H01M 8/04276* (2016.01)
*H01M 8/0444* (2016.01)
(Continued)

(52) U.S. Cl.
CPC ..... *H01M 8/04276* (2013.01); *H01M 8/0444* (2013.01); *H01M 8/04455* (2013.01);
(Continued)

(58) Field of Classification Search
None
See application file for complete search history.

(56) References Cited

U.S. PATENT DOCUMENTS 5,162,168 A     11/1992 Downing et al.
6,475,655 B1 *  11/2002 Nakanishi ............... B60L 1/003
                                    429/424

(Continued)

OTHER PUBLICATIONS

International Search Report corresponding to PCT Application No. PCT/US2014/066866, dated Mar. 31, 2015 (3 pages).

*Primary Examiner* — Haroon S. Sheikh
(74) *Attorney, Agent, or Firm* — Maginot Moore & Beck LLP (57) ABSTRACT

A flow battery system and method of operating the system minimizes performance losses. The flow battery system includes at least one cell, a first tank including a liquid electrolyte, a pump operably connected to the first tank and to the at least one cell, and a second electrolyte tank operably connected to the at least one cell. The flow battery system further includes a memory including program instructions stored therein, at least one sensor configured to a generate at least one signal associated with a sensed condition of the battery system, and a controller operably connected to the at least one sensor, the pump, and the memory and configured to execute the program instructions to determine a dead zone condition exists based upon the at least one signal, and control the pump to pulse flow of the liquid electrolyte to the at least one cell based upon the determination.

16 Claims, 7 Drawing Sheets

(51) Int. Cl.
    *H01M 8/04537*     (2016.01)
    *H01M 8/04746*     (2016.01)
    *H01M 8/18*     (2006.01)
    *H01M 8/20*     (2006.01)
    *H01M 8/04223*     (2016.01)

(52) U.S. Cl.
    CPC ... *H01M 8/04552* (2013.01); *H01M 8/04559* (2013.01); *H01M 8/04753* (2013.01); *H01M 8/188* (2013.01); *H01M 8/20* (2013.01); *H01M 8/04231* (2013.01); *Y02E 60/528* (2013.01)

(56) References Cited

U.S. PATENT DOCUMENTS

| | | |
|---|---|---|
| 7,537,859 B2 | 5/2009 | Samuel et al. |
| 2004/0209153 A1* | 10/2004 | Peled ............... H01M 4/8605 429/414 |
| 2010/0090651 A1 | 4/2010 | Sahu et al. |
| 2012/0328911 A1 | 12/2012 | Hennessy |
| 2013/0149573 A1 | 6/2013 | Krupadanam et al. |
| 2013/0177789 A1* | 7/2013 | Kampanatsanyakorn ............... H01M 8/188 429/70 |
| 2015/0318567 A1* | 11/2015 | Darling ............... H01M 8/188 429/418 |
| 2015/0325874 A1* | 11/2015 | Spaziante ......... H01M 8/04955 429/418 |
| 2016/0013505 A1* | 1/2016 | Darling ............... H01M 8/188 429/418 |

* cited by examiner

SYSTEM AND METHOD FOR MINIMIZING TRANSPORT RELATED PERFORMANCE LOSSES IN A FLOW BATTERY SYSTEM

CLAIM OF PRIORITY

This application is a 35 U.S.C. § 371 National Stage Application of PCT/US2014/066866, filed on Nov. 21, 2014, which claims the benefit of priority to U.S. Provisional Application No. 61/906,999, filed on Nov. 21, 2013 and entitled "System and Method for Minimizing Transport Related Performance Losses in a Flow Battery System," the disclosures of which are incorporated herein by reference in their entireties.

STATEMENT REGARDING FEDERALLY SPONSORED RESEARCH OR DEVELOPMENT

This invention was made with government support under DE-AR0000137 awarded by the Department of Energy Advanced Research Projects Agency-Energy. The government has certain rights in the invention.

TECHNICAL FIELD

This disclosure relates generally to the field of rechargeable batteries and more particularly to flow batteries and flow battery systems.

BACKGROUND

As intermittent renewable energy sources such as wind and solar increase their share of overall energy production, a method is required to compensate for their intermittency and to match the demand of a power grid in real time. Numerous methods have been discussed to stabilize intermittent renewables, including grid extension to average over larger sets of intermittent assets, demand-side management, ramping of conventional assets, and energy storage, including technologies such as electrochemical storage, such as Li-ion, Na/S, and Na/NiCl2, thermal storage, power to gas, and other energy storage technologies. Flow batteries are one particularly promising technology used to store electrical energy and stabilize power flow from intermittent renewable energy sources. While the most prominent flow battery couple uses vanadium at different oxidation states at each electrode, there are many other couples under consideration, with reactants in the gas, liquid, and solid forms.

One particular flow battery reacts H2 and Br2 to form HBr on discharge. One advantage of this couple is that the H2 reaction is kinetically rapid when catalyzed and the Br2 reaction is kinetically rapid, whether or not the reaction is catalyzed. Rapid kinetics and the ability to obtain components from the related system reacting H2 and O2 in a proton-exchange membrane fuel cell enable the H2/Br2 chemistry to achieve a very high power density. This high power density reduces the area required for a given amount of power and, since the system cost has a significant dependence on the total area over which the reactions are carried out, holds promise for energy storage with reduced costs.

Figure 1:
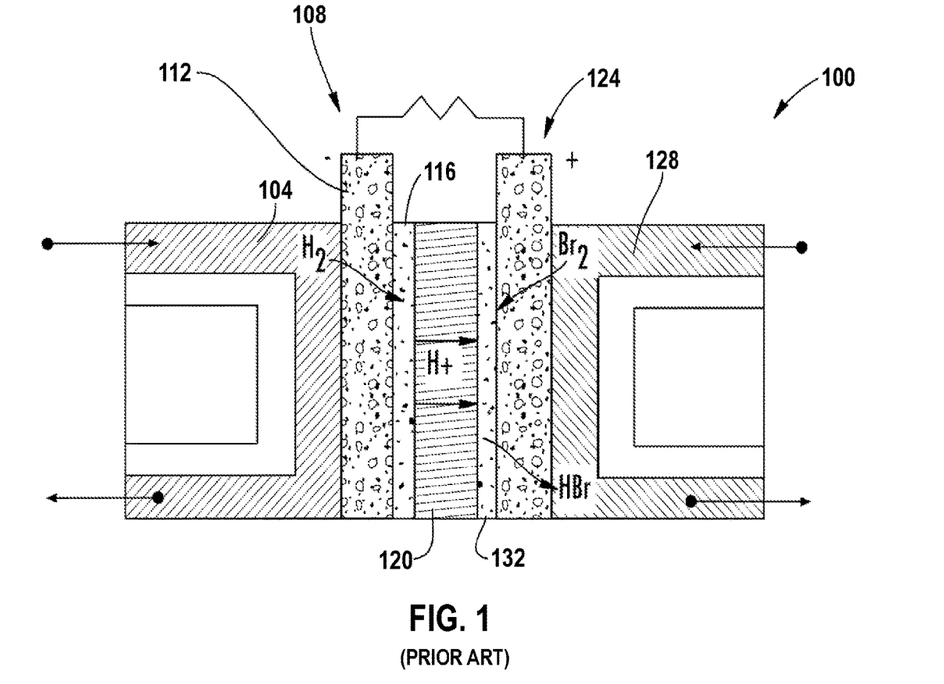
FIG. 1 is a schematic diagram of a conventional flow battery cell.

FIG. 1 illustrates a schematic diagram of a conventional H2/Br2 flow battery cell 100 including a number of cell layers included in the cell 100. FIG. 1 illustrates the reactions occurring during battery discharge, though reversing the illustrated reactions results in charging the battery cell 100. Hydrogen gas (H2) is sent through a hydrogen gas channel 104 into a negative electrode 108, at which a porous medium 112 and a catalyst layer 116 are present. The catalyst layer 116 is typically made of Platinum (Pt) to catalyze H2 oxidation on discharge and hydrogen ion (H+) reduction on charge. During discharge, H+ is produced from the H2 gas via the reaction H2→2H++2e−. The H+ passes through a membrane 120 to a positive electrode 124, where it is combined with Br− to form hydrobromic acid (HBr) via the reaction Br2+2H++2e−→2HBr. The membrane 120, in one or more embodiments, is an ion-exchange membrane, such as the cation-exchange membrane Nafion, or a separator with pores through which the H+ passes. On the positive electrode side a solution composed of Br2 and HBr is delivered and flows through a Br2/HBr channel 128 by the positive electrode 124. A porous electrode 124 is always present, though the catalyst 132 layer is optional on the positive electrode side since the kinetics of the Br2 reaction (Br2+2e−→2Br− on discharge and 2Br−→Br2+2e− on charge) are fast even on uncatalyzed carbon. The presence of HBr, which typically dissociates to form H+ and Br—, allows for the conduction of ionic current within the porous electrode. The electrons are passed through an external circuit, where useful work may be extracted (discharge) or added (charge) to the circuit.

Figure 2:
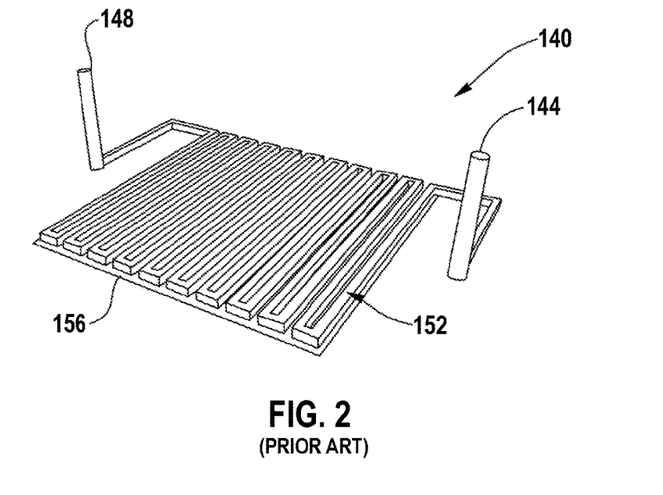
FIG. 2 is schematic diagram of a flow-by cathode design of a conventional flow battery.

FIG. 2 illustrates a prior art flow-by cathode design 140 of a flow battery having an inlet 144, an outlet 148, and a cell area of 10 cm2. Active material is transported from the open flow channels 152 down through the porous electrode layer 156. During operation, electrochemical reactions occur within this porous electrode 156. The cell's membrane sits adjacent to the lower face of the porous electrode.

The cathode in FIG. 2 is a flow-by cathode design, in which active material is transported into a cell through open channels that sit adjacent to the porous electrode. On the liquid side of the H2/Br2 system, this active material is either Br2 (during discharge) or HBr (during charge). Polybromides, such as Br3 and Br5⁻ also serve as reactants during discharge. The active material is then further transported from the open channels into the porous electrode.

While the H2/Br2 system has a high power density, numerous challenges remain, including ensuring safe operation of the battery and achieving a low-cost design for a H2/Br2 battery system. Furthermore, the battery system must be designed to limit degradation of the cell components, which is exacerbated by the crossing of the H2, Br2, and HBr through the ion-exchange membrane that is typically used, as well as the strongly acidic nature of the HBr solutions used for the flow batteries. Finally, the flow battery system must be designed to maintain high concentrations of the active material throughout the electrode.

During normal cell operation, relatively high concentrations of the active material are present throughout the electrode. Because concentrations are high, the electrochemical reactions occur without incurring significant voltage penalties. However, when the battery is either fully charged or fully discharged, the concentration of the active materials tends toward relatively small values. In such instances, the cell voltage is reduced dramatically due to the low concentrations of the active materials.

In general, active material can be transported to reactive areas of a flow battery's porous electrode by diffusive, convective, or migration processes. However, when high current densities are needed, diffusive transport cannot be relied upon as a transport mechanism because it is a relatively slow process, and migration is also limited by the intrinsic mobility of species within a solution. Rather, only convective transport can provide sufficient concentrations of active materials to the electrode reaction zones when high current densities are desired.

Flow batteries and flow battery systems are only operated successfully if sufficient concentrations of reactant materials are transported to electrochemical reaction zones on both sides of the battery's cell membranes. During operation of the battery, it is possible that transport of active material through regions of the electrode slows, and the active material that has been electrochemically depleted in these regions may not be replenished with fresh active material from the system storage tanks. The regions in which the electrochemically depleted material is not replenished experience low active material concentrations, and are referred to herein as "dead zones." Low active material concentrations in some regions can result in reduced performance of the battery, for example causing a decrease in the overall cell voltage during discharge, an increase in the cell voltage during charge, or local changes in the porous electrode's potential field. Changes in the cell voltage negatively impact the efficiency of the battery cell's energy storage capabilities. Furthermore, local changes in the electrode potential can cause cell corrosion and degradation.

Electrical energy is required to operate pumps to convectively transport reactant materials to reaction zones. It is desirable to minimize the power required to transport the materials to the electrochemical reaction zones, since power used by the pump reduces the overall energy efficiency of the flow battery system.

Consequently, what is needed is a flow battery and flow battery system which operates efficiently and delivers sufficient power upon demand, including peak demands of power in various conditions. Additionally, what is needed is a flow battery system reducing the formation of regions having slow transport processes and depleted levels of active material during normal cell operation, while balancing the power drain from operating pumps that increase the transport processes in the flow battery system.

SUMMARY

In one embodiment, a flow battery system minimizes performance losses in the system. The flow battery system includes at least one cell, a first tank including a liquid electrolyte, a pump operably connected to the first tank and to the at least one cell, and a second electrolyte tank operably connected to the at least one cell. The system further includes a memory including program instructions stored therein, at least one sensor configured to a generate at least one signal associated with a sensed condition of the battery system, and a controller operably connected to the at least one sensor, the pump, and the memory. The controller is configured to determine a dead zone condition exists based upon the at least one signal and control the pump to pulse flow of the liquid electrolyte to the at least one cell based upon the determination. The controller is therefore advantageously able to adjust the flow based on the conditions in the battery to prevent and remedy dead zones or other detrimental conditions.

In another embodiment of the system, the determination that a dead zone condition exists includes determining that a carbon dioxide concentration exceeds a predetermined threshold.

In yet another embodiment of the system, the determination that a dead zone condition exists includes determining that a time derivative of a carbon dioxide concentration exceeds a predetermined threshold.

In one or more embodiments of the system, the at least one sensor comprises the CO2 sensor.

In another embodiment of the system, the CO2 sensor is in fluid communication with the first tank.

In some embodiments of the system, the at least one sensor comprises the voltage sensor and the CO2 sensor.

In another embodiment of the system, the pulse flow includes a reversal in the direction of flow of the liquid electrolyte.

In a further embodiment of the system, the pulse flow comprises a predetermined variation in flow rate at predetermined intervals.

In another embodiment according to the disclosure, a method of operating a flow battery system minimizes flow losses in the battery system. The method includes generating, with at least one sensor, at least one signal associated with a sensed condition of a battery system having at least one cell, a first tank including a liquid electrolyte, and a second electrolyte tank operably connected to the at least one cell. The method further comprises determining, with a controller configured to execute programmed instructions stored in a memory, a dead zone condition exists in the battery system based upon the at least one signal, and executing programmed instructions stored in the memory with the controller to control a pump operably connected to the first tank and to the at least one cell to pulse flow of the liquid electrolyte to the at least one cell based upon the determination.

In another embodiment of the method, the generating with the at least one sensor comprises one or more of generating a voltage signal with a voltage sensor operably connected to the at least one cell and generating a carbon dioxide concentration signal with a carbon dioxide sensor configured to detect carbon dioxide generated in the at least one cell.

In one or more embodiments of the method, determining a dead zone condition exists comprises determining that the carbon dioxide concentration signal exceeds a predetermined threshold.

In a further embodiment of the method, determining a dead zone condition exists comprises determining that a time derivative of the carbon dioxide concentration signal exceeds a predetermined threshold.

In yet another embodiment, the generating with the at least one sensor comprises generating the carbon dioxide concentration signal with the carbon dioxide sensor.

In one embodiment of the method, the generating of the carbon dioxide concentration signal comprises generating the carbon dioxide concentration signal corresponding to a carbon dioxide concentration in the first tank.

In another embodiment of the method, the generating with the at least one sensor comprises generating the voltage signal with the voltage sensor and generating the carbon dioxide concentration signal with the carbon dioxide sensor.

In yet another embodiment of the method, the controlling of the pump includes pulsing the flow by reversing the direction of flow of the liquid electrolyte.

In a further embodiment of the method, the controlling of the pump comprises pulsing the flow with a predetermined variation in flow rate at predetermined intervals.

DETAILED DESCRIPTION

For the purposes of promoting an understanding of the principles of the embodiments disclosed herein, reference is now made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

Figure 3:
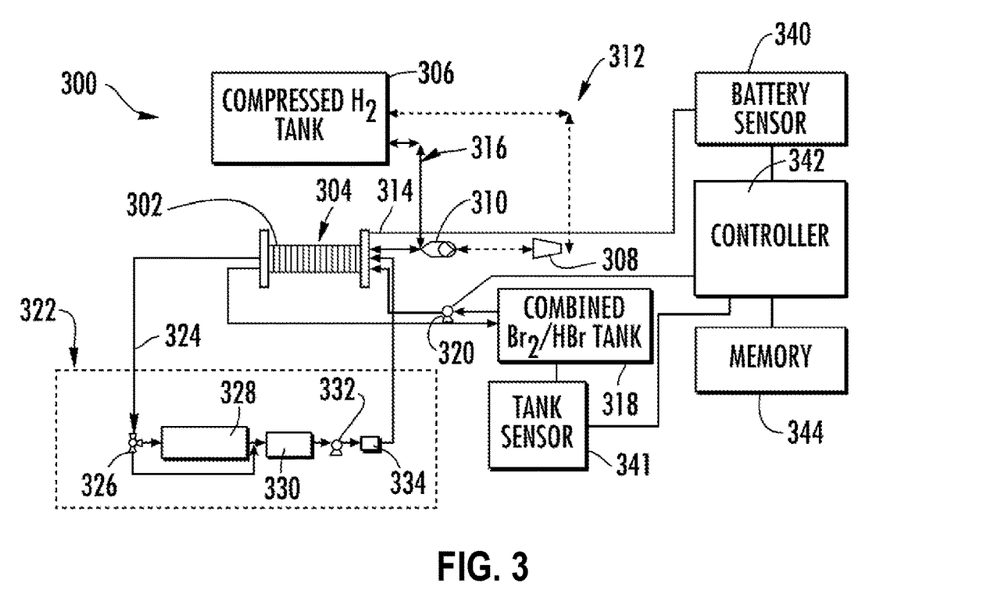
FIG. 3 is a schematic diagram of an H2/Br2 flow battery system according to the present disclosure.

FIG. 3 schematically illustrates an embodiment an H2/Br2 flow battery system 300 according to the present disclosure. A plurality of cells 302 are stacked together to form a battery stack 304. A supply tank 306 for the hydrogen gas H2 is coupled to a compressor 308, which is coupled to a pressure regulator 310. A mechanical compression line 312, in one embodiment, extends from the tank 306 through the compressor 308, through the pressure regulator 310 and to a hydrogen input 314 of the battery stack 304. In another embodiment, an electrochemical H2 compression line 316 is provided in place of or in addition to the mechanical compression line 314. Electrochemical hydrogen compression or mechanical hydrogen compression is used to increase the energy density of the system.

A supply tank 318 stores a hydrogen bromide (Br2/HBr) solution, which is delivered through a pump 320 to a Br2/HBr input of the battery stack 304. In some embodiments, the flow battery system 300 includes a separate coolant loop 322 to cool the Br2/HBr solution flowing through the battery stack 304. The coolant loop 322 receives solution at an input 324 coupled to a thermostat/valve 326, which either directs the solution through a high temperature radiator 328 or bypasses the radiator 328 to a coolant reservoir 330. Cooled solution is stored in the reservoir 330 for delivery to the battery stack 304 by coolant pump 332 through a coolant DI filter 334. In other embodiments, the Br2/HBr solution is passed through a radiator for cooling instead of the system including a separate coolant loop 322.

As described above, compression of the H2 gas, in different embodiments, is accomplished in a number of ways, including electrochemical compression through line 316 or as mechanical compression through line 312. Electrochemical compression has higher energy efficiency than mechanical compression, but results in the battery stack 304 operating at an elevated pressure. In some embodiments, a battery management system (not shown) is required to ensure the efficient operation of the H2/Br2 battery system. In particular, during discharge of the battery stack 304, a predetermined flow of H2 and Br2/HBr is sent through the battery stack 304, wherein the flow is related to the current demanded from the device being supplied with power delivered by the battery stack 304. In addition, during charging of the battery stack 304, a predetermined flow of gas and solution is required to remove the products generated from the cell stack.

The pressure of the hydrogen in the tank(s), in different embodiments, ranges from several bar to several hundred bar, depending on the desired energy density of the system and the permissible energy for H2 compression. The composition of the Br2/HBr electrolyte is chosen based on several factors, including determining the amount of HBr that needs to be present to allow rapid ionic transport within the solution, determining a sufficient amount of Br2 such that the size of the Br2/HBr tank is within design limits for the system, and determining the point at which, as the HBr concentration is increased, the conductivity of membranes (typically Nafion) of the flow battery stack 304 falls due to the membrane drying out. In one embodiment, the concentration in the fully charged state is 1M Br2 in 1M HBr, though higher or lower concentrations are used in other embodiments.

The flow battery system 300 further includes a battery sensor 340 operably coupled to the battery stack 304 and a tank sensor 341 operably coupled to the Br2/HBr storage tank 318. The sensors 340, 341 sense operating conditions of the battery stack 304 and storage tank 318, respectively, and generate electronic signals provided to a controller 342 operatively coupled thereto. In the illustrated embodiment, the battery sensor 340 is configured to sense a battery voltage of the battery and the tank sensor 341 is configured to sense a concentration of carbon dioxide in the tank 318. In some embodiments, only one of the battery sensor 340 and the tank sensor 341 is used in the flow battery system 300. In alternative embodiments, a different sensor is provided to measure another condition in the flow battery system 300.

Operation and control of the various components and functions of the flow battery system 300 are performed with the aid of the controller 342. The controller 342 is implemented with general or specialized programmable processors that execute programmed instructions. The instructions and data required to perform the programmed functions are stored in a memory 344 associated with the controller 342. The processors, memory, and interface circuitry configure the controller 342 to perform the functions and processes described herein. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

The memory 344 is operatively coupled to the controller 342 and is configured to store programmed instructions. The controller 342 is configured to manipulate the data received and to control the pump 320 according the programmed instructions. While the memory 344 is illustrated as being separate from the controller 342, the memory, in different embodiments, is located within the controller or at other location accessible by the controller 342. The pump 320 moves fluid to the battery stack 304 from the tank 318 at a flow rate for a period of time as the pump 320 is operated by the controller 342.

In different embodiments, the controller 342 is configured to implement one or more strategies for minimizing the size and occurrence of dead zones using the data obtained from the sensor or sensors. As discussed above, a dead zone occurs when a region of the battery is depleted of active materials, or the concentration of the active materials decreases below a threshold. The dead zone typically occurs when the transport of the electrolyte solution through the battery is too slow to maintain pace with the reactions, or the fluid dynamics in the flow result in certain areas in the battery becoming stagnant.

In some embodiments, the controller 342 is configured to monitor the signals produced by the sensors 340, 341, and determine whether a dead zone condition exists. A dead zone condition is determined by the controller 342 to exist when various thresholds are met based upon one or more of the parameters sensed by the sensors 340, 341. The thresholds are selected as values of the parameters above at which it is possible that a dead zone is present in the battery system. S discussed in more detail below, a dead zone condition may be determined to exist when a time derivative of the battery voltage exceeds a threshold, when a $CO_2$ concentration in the $Br_2$/HBr tank exceeds a threshold, or when the time derivative of the $CO_2$ concentration in the $Br_2$/HBr tank exceeds a threshold. The absolute thresholds used by the controller 342 to determine the existence of a dead zone condition may differ depending on the battery status. The battery status, as defined herein, varies based on the load on the battery system, charge available, and overall health of the battery, but is unaffected by the existence of a dead zone in the battery.

Figure 4:
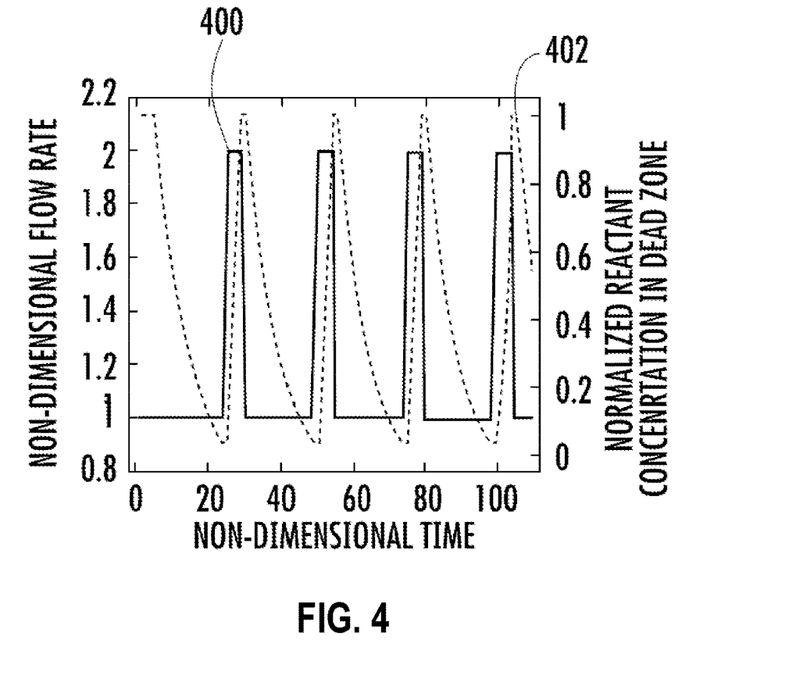
FIG. 4 is a graph of flow rates of ionic solutions versus time in one embodiment of a flow rate control method through a flow battery.

One example of a passive control method is shown in FIG. 4, in which a normalized liquid flow rate 400 is shown as a solid line and the resulting normalized concentration of active material in a potential dead zone 402 is shown in dashed lines. The control method of FIG. 4 operates to periodically pulse the pump speed, and therefore the flow rate, for short durations. Increasing the pump speed at specified intervals, as shown by line 400, provides periodic increases in convective transport of the solution through the cells, which thereby increases the concentration of active material near potential dead zones, as shown by the peaks in line 402. In the embodiment illustrated in FIG. 4, the pulses are rectangular, though in other embodiments the pulses have other shapes, including linear and sinusoidal ramps, as well as other forms. In addition, other embodiments operate to pulse the pump speed one or more time during a single charge or discharge cycle in response to sensor outputs from the battery system. Pulsing the pump at specified intervals minimizes efficiency losses in the flow battery and reduces or prevents corrosion processes. In addition, the power required to operate the pump at increased speeds only for short durations is less than operating the pump at higher speeds at all times, as will be discussed in detail below. As used herein, pulsing the pump flow rate is defined as a controlled variation in the pump flow rate that is not related to the battery status other than dead zone considerations. As such, the pulses described herein relate only to the existence of a dead zone condition, and are not related to the battery charge, consumer power load, health, or other parameters of the battery. In addition, pulsing the pump flow rate may include reversing the pump flow for a period of time, increasing and decreasing the pump speed at predetermined intervals, or other variations in the flow rate produced by the pump.

While specific values are used in the relationships described, the specific values are merely illustrative, since the specific values depend on the specific design of the flow battery system. The timescale associated with dead zone formation is generally between tens of seconds and a few minutes, and higher pump speeds dramatically increase convective transport in porous electrode material. The controller 342 therefore typically operates the pump 320 with pump speed pulses of relatively low frequency and short duration to reduce dead zone formation.

Figure 5:
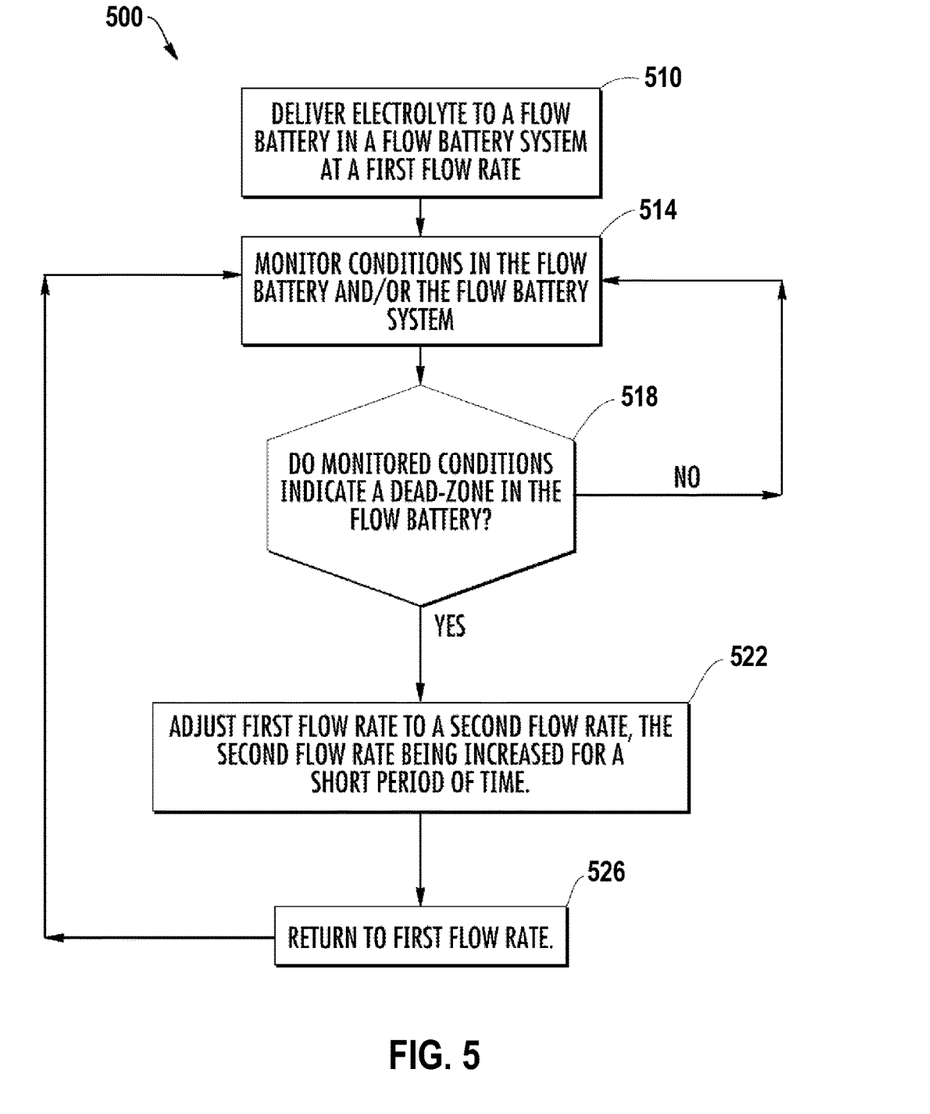
FIG. 5 is a flow diagram of a method for reducing or substantially eliminating a dead zone in a flow battery.

FIG. 5 is a flow diagram of a process 500 used by an active control system for reducing or substantially eliminating a dead zone in a flow battery system, for example the flow battery system 300 of FIG. 3. The method refers to the controller 342 executing programmed instructions stored in the memory 344 to cause the pump 320 and sensors 340, 341 to perform the functions described above that the processes described below. The process 500 begins with delivering an electrolyte, with a pump 320, to a flow battery 302 in a flow battery system 300 at a first flow rate (block 510). The nominal flow rate may be related to the power demanded by the consumer to which the flow battery system 300 is operably connected.

Once the flow is delivered, the conditions in the flow battery 302 and/or flow battery system 300 are monitored (block 514). In some embodiments, the condition monitored is the time derivative of the battery voltage, as sensed by the battery sensor 340, while in other embodiments the condition monitored is the time derivative of the $CO_2$ concentration in the tank or the absolute concentration of the $CO_2$ in the tank, as measured by the tank sensor 341. At block 518, the controller 342 determines whether the monitored conditions indicate a dead zone condition in the flow battery. For example, in an embodiment configured to monitor the time derivative of the battery voltage, an increase in the derivative above a predetermined threshold of the battery voltage causes the controller 342 to determine a dead zone condition exists. Likewise, in embodiments configured to monitor the time derivative of the $CO_2$ concentration, an increase in the time derivative of the concentration of $CO_2$ in the tank 318 causes the controller 342 to determine the dead zone condition exists, while in embodiments configured to monitor the absolute concentration of $CO_2$, a $CO_2$ concentration above a predetermined threshold causes the controller 342 to determine a dead zone condition exists. If the controller 342 does not determine a dead zone condition exists, indicating the possible presence of a dead zone in the battery system, the process 500 continues with the monitoring of the conditions in the battery 302 or flow system 300 at block 514.

If the conditions monitored are above the threshold values, indicating that a dead zone condition exists, the controller 342 operates the pump 320 to pulse the flow of the liquid electrolyte in the battery system 300 (block 522). As discussed above, pulsing the flow rate of the pump 320 means the controller 342 operates the pump 320 to produce a controlled variation in the flow rate that is not related to the battery status. As such, the pulses described herein are related only to the existence of the dead zone condition determined by the controller, and are not related to the charge, power consumption, or the health of the battery.

Once the one or more pulsed flow rates of the solution have been delivered to the flow battery, the controller 342 operates the pump 320 to return the flow rate to the first flow rate (block 526) and the process continues with the monitoring of the condition of the battery and/or system at block 514. In some embodiments, a flow rate other than the first flow rate is selected and applied to the battery based on the battery status changing, for example if the amount of power being demanded by the consumer to which the battery system 300 is connected changes during the pulsing of the flow.

Figure 6:
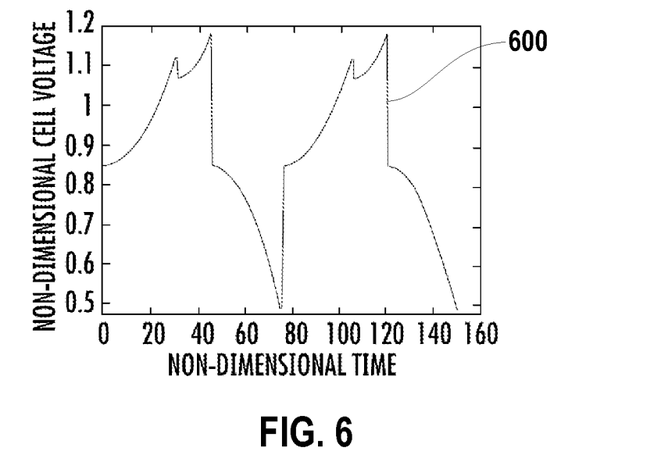
FIG. 6 is a graph of a voltage profile from two charge and discharge cycles using the described flow rate control method.
Figure 7:
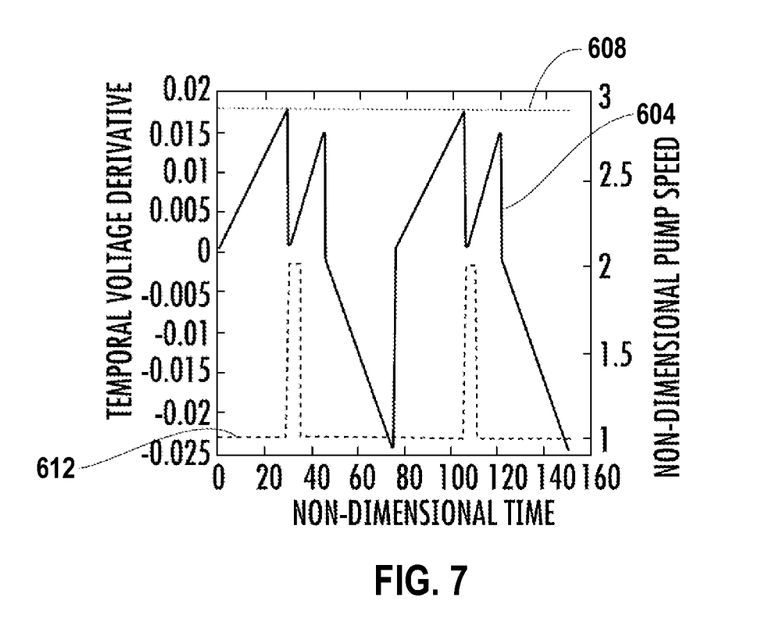
FIG. 7 is a graph of a time derivative of the voltage signal of FIG. 6, a derivative threshold, and a pump speed indicative of a flow rate of an ionic solution.

Representative profiles from an active implementation of the control method that uses the time derivative of the voltage signal for feedback are illustrated in FIGS. 6 and 7. The voltage profile 600 for two charge and discharge cycles is shown in FIG. 6, while the time derivative 604 of the voltage signal 600 is shown as a solid line in FIG. 7. A particular and system-specific predetermined value 608 of the voltage time derivative 604 is chosen to serve as a proxy or an indicator of dead zone formation. As discussed above, rapid voltage increases are one of the possible consequences of dead zone formation. When this time derivative 604 reaches a predetermined upper threshold 608, shown by the dotted line, the controller determines a dead zone condition exists, meaning it is possible that one or more dead zones have formed in the battery, and the controller pulses the pump speed. In the illustrated embodiment, the controller operates the pump to increase the pump speed 612 by a factor of 2 in response to the dead zone condition. The increased pump speed increases convective transport in the cell, which results in replenishment of the active material. The rate of voltage rise is therefore decreased, allowing the charge cycle to fully utilize the capacity of the liquid material in the system's tank and enabling a larger charging capacity. Again, while the pulse form shown in FIG. 7 is rectangular, other pulse shapes may also be used, including linear and sinusoidal ramps and other forms. In other embodiments, pulsed flow rates having different amplitudes, different durations of time, and different directions of flow are used.

In some embodiments, the time derivative of CO2 concentrations in the gas phase material that occupies the head space of the system's liquid (Br2/HBr) tank is used to provide feedback to the controller. CO2 concentration directly indicates the extent to which carbon corrosion is occurring in the system. As is discussed in detail below, dead zones in the battery system result in carbon corrosion in the system, thereby increasing the concentration of CO2. The time derivative of the quantity of CO2 concentration is used in some embodiments, for example those embodiments without CO2 scrubbers to remove the CO2 gas collecting in the head space of a liquid tank. In such embodiments, the time derivative of CO2 concentration is a better approximation of the existence of dead zones than the absolute concentration of CO2, which accumulates naturally over time. However, in some embodiments, for example those embodiments having a system with a CO2 scrubber in the tank, the absolute concentration of CO2 is used as a control feedback variable since the accumulation of CO2, under normal operating conditions, is eliminated by the scrubber. Similarly, in other flow battery designs, other physical variables that serve as a functional indicator of the presence of dead zones may be used as feedback variables.

In some embodiments, the flow battery system is configured only to monitor the condition of the battery and pulse the flow of the pump only when the system is operating at particularly high currents. Such high currents may occur during only a small fraction of the operating window and result from peak power events at a solar or wind installation. In such embodiments, the battery need only operate at peak performance during the peak power events, and pulsing of the flow to prevent dead zones is not necessary during low or moderate loads. In other embodiments, the flow battery system is configured to operate frequently at high current densities in order to minimize the plant costs that are needed to meet particular power demands, and the pulsing of the pump flow rate may be necessary on a periodic basis.

In some embodiments, the controller is configured to pulse the pump flow rate by operating the pump in reverse to reverse the flow of the solution in response to a detection of a dead zone. Flow reversal is especially effective for systems with asymmetric geometries and flow structures, because different flow patterns exist at upstream and downstream locations in the cell. Reversing the flow results therefore in a modified flow pattern, breaking up the dead zone and returning the cell to normal flow.

Figure 8:
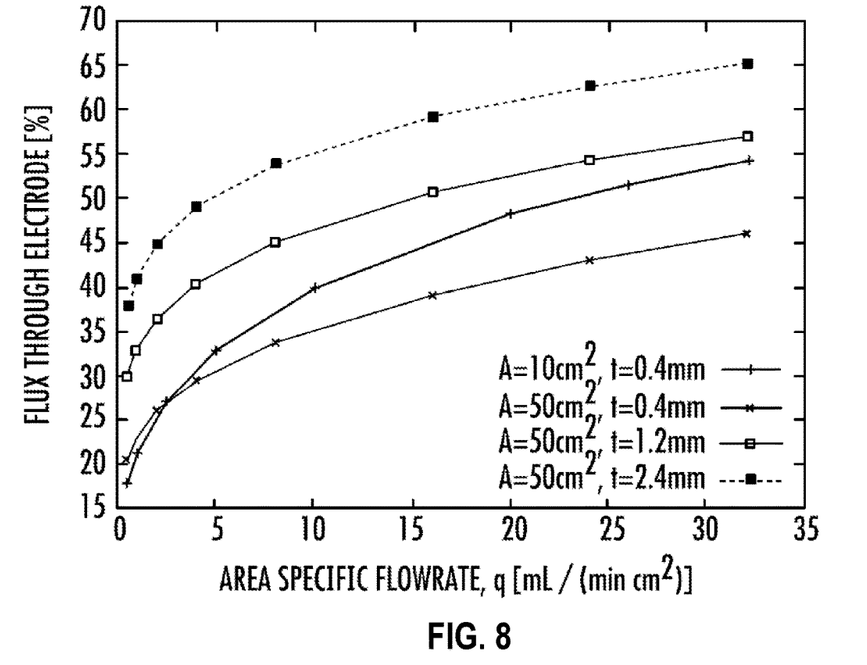
FIG. 8 is a graph of area specific flow rates versus a flux through an electrode along a cut plane.

Information about pulse duration is provided by analysis of flow through the H2/Br2 cathode as seen in the graph of FIG. 8, which shows data from a computational fluid dynamics simulation of the flow. The electrode flux percentage is plotted in FIG. 8 for a variety of different cell areas, electrode thicknesses, and flow rates, where "A" is the area of the battery cell, and "t" is the thickness of the electrode. Velocity information is extracted from a cut plane of the battery cell, and the amount of total normal flux through the cut plane through a channel (for example battery channel 152 of FIG. 2) of the battery is computed. The variable plotted is the determined percentage of the total normal flux through the cathode that passes through the porous electrode plane of the battery (for example through porous electrode 156 of FIG. 2). The remaining flux passes through the open channels. The important relationship derived from the data of FIG. 8 is that the relative amount of liquid flowing, i.e. the flow rate, through the electrode increases non-linearly with the mass flow rate. Consequently, short duration pulses of the liquid pump increase convective transport by two mechanisms. First, the pulses increase the total volumetric flowrate through the electrode, and second, the pulses increase the relative amount of the flow that passes through the electrode, or the percentage of total flow through the battery channels that passes through the electrode layer. These two relationships demonstrate that short duration pulses significantly disturb the flow in the battery electrode, which results in replacing used active material and replenishing dead zones in an electrode.

As discussed above, increasing the pump speed to increase the electrolyte flow through the battery requires power. The effectiveness of a pulsing method is quantified by comparing the power that must be parasitically drained from the flow battery to run the liquid pump. Assuming ideal pump behavior, the pumping power (P) required to move liquid through the cathode is proportional to the pressure drop through the cathode ($\Delta p$) and the flow rate (Q), $P \sim \Delta p * Q$.

Figure 9:
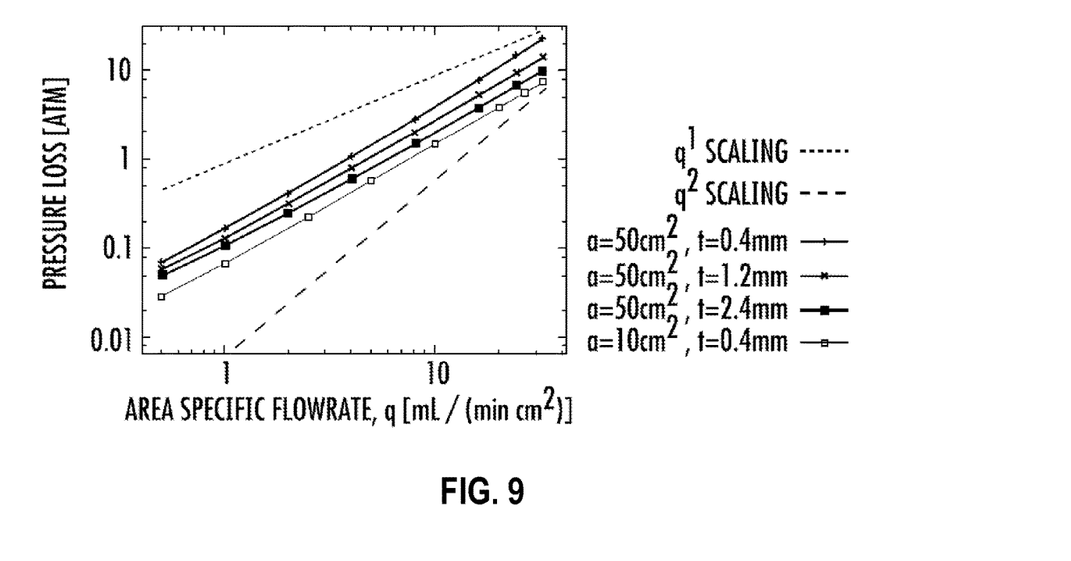
FIG. 9 is a graph of pressure loss versus area specific flow rate of an ionic solution through serpentine channel flow battery cathodes.

FIG. 9 illustrates computational fluid dynamics (CFD) calculations of the pressure drop through serpentine channel flow battery cathodes, plotted as a function of the liquid flow rate divided by the area of the cell. Data is shown for cells with different areas (a) and electrode thicknesses (t), and are performed with similar test parameters as those used in FIG. 8. Linear (q1) and quadratic (q2) scaling curves are also shown on FIG. 9 for comparison. The experimental tests indicate that the pressure drop scales with flow rate approximately on the order of $\Delta p \sim Q3/2$. Since, as discussed above, the power is proportional to the pressure drop multiplied by the flow rate ($P \sim \Delta p * Q$), the pumping power therefore scales approximately as $P \sim Q3/2 * Q$, or $P \sim Q5/2$.

The relative power requirements for different pump operation scenarios are calculated in Table 1. The first three scenarios computed are the pumping power requirements for operating the pump at a steady, not pulsed, baseline, or 100%, flow rate, at a steady flow rate of 150% of baseline, and at a steady flow rate at 200% of baseline. The next two scenarios illustrate pulsing the pump flow rate by 50% for 5% and 15% of the operating time of the pump, while the final scenario calculates the power increase to pulse the pump flow rate by 100% for 10% of the operating time of the pump.

TABLE 1

| Relative Flow Rates (Baseline, Pulsed) | If Pulsed, % Of Time Spent At Higher Flow Rate | Relative Pumping Power Requirement |
| --- | --- | --- |
| 1.0, N/A | N/A | 1.00 |
| 1.5, N/A | N/A | 2.76 |
| 2.0, N/A | N/A | 5.66 |
| 1.0, 1.5 | 5% | 1.09 |
| 1.0, 1.5 | 15% | 1.26 |
| 1.0, 2.0 | 10% | 1.47 |

As can be seen, the pulsing method that pulses the flow rate by 50% for 5% of the time results in only a 9% increase in power requirement, while the pulsing method that pulses the flow rate by 50% for 15% of the operating time of the pump results in a 26% increase in the power requirement. The pulsing method that doubles the flow rate (pulsed flow rate of 2.0) during 10% of the operational cycle increases pumping losses by 47% relative to baseline operation. Compared to the method that pumps steadily at flow rates 50% above the baseline, which results in a 176% increase in pumping power requirements, and 100% above the baseline, which results in a 466% increase in pumping power requirements, it can be seen that pulsing the pump to reduce and prevent dead zone formation is much more efficient than operating the pump at a steady higher speed. Pulsing the flow rate through the battery therefore allows the system to operate at a lower nominal flow rate, thereby reducing the power required to operate the pump and increasing the overall efficiency of the flow battery system, while still limiting the potential for dead zone formation.

Figure 10:
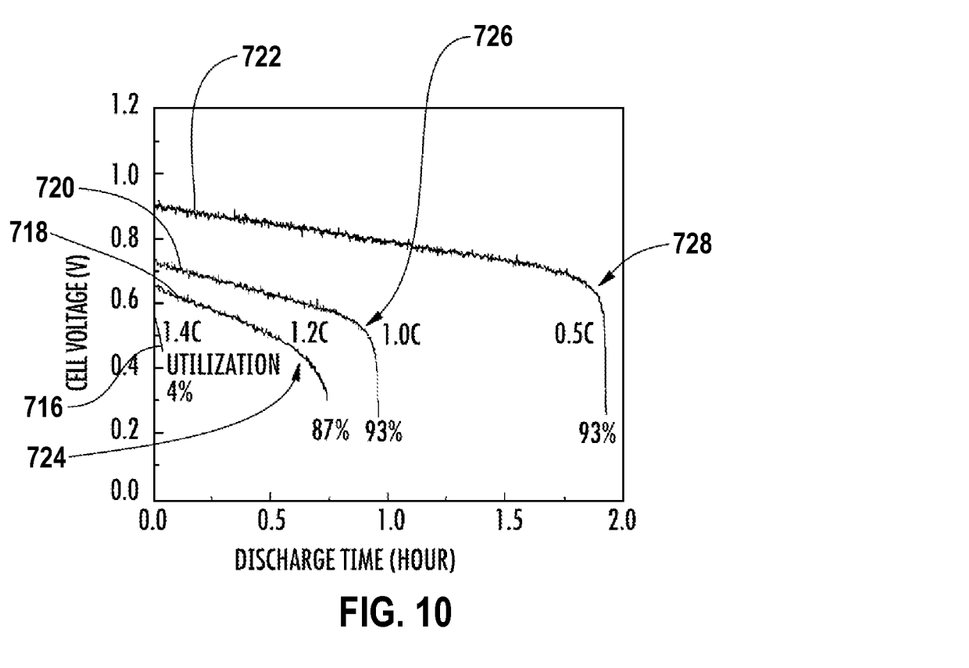
FIG. 10 is a graph of discharge curves from a H2/Br2 flow battery system.

FIG. 10 illustrates examples of four discharge curves 716, 718, 720, 722 of normalized currents. The discharge curves of three normalized currents 718, 720 and 722 from an operating H2/Br2 flow battery shows that during a discharge cycle, the voltage typically decreases rapidly due to an insufficient supply of reactant. For each of the curves 718, 720 and 722, the cell voltage falls rapidly at points 724, 726 and 728, respectively, at which points the flow battery has an insufficient supply of reactant. This behavior is expected under normal cell operation, because voltage falloff occurs when the concentration of active materials in the electrode becomes too small, i.e. when the battery is discharged.

Of particular importance is that when the rate becomes sufficiently high (1.4 C in this case), only a small fraction of available reactant is utilized (4% in this case, as indicated by curve 716 in FIG. 10), while at lower rates (1.2 C and below, illustrated by curves 718, 720, and 722, which have utilization of 87%, 93%, and 93%, respectively) nearly all of the reactant is utilized. The high reaction rate (line 716) illustrates that the reaction consumes the active material in the zones in which the reactions are occurring faster than the material can be replenished by transport processes, and the active material is therefore not used because the porous electrode becomes saturated with the depleted electrolyte. The pulsing of the pump discussed herein supplements the transport of the active material, thereby increasing utilization of the active material even when the reaction is occurring very rapidly. Thus, as discussed above, pulsing the flow rate through the battery enables increased utilization of the active materials in the battery and therefore improves energy storage capacity of the flow battery system.

Figure 11:
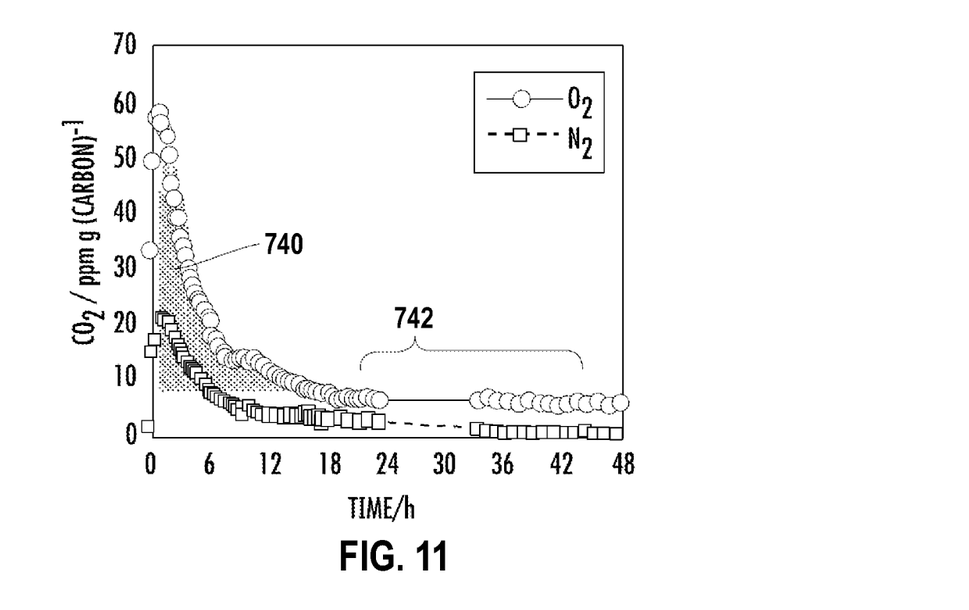
FIG. 11 is a graph of measurements of CO2 produced by a carbon corrosion reaction in a flow battery system.
Figure 12:
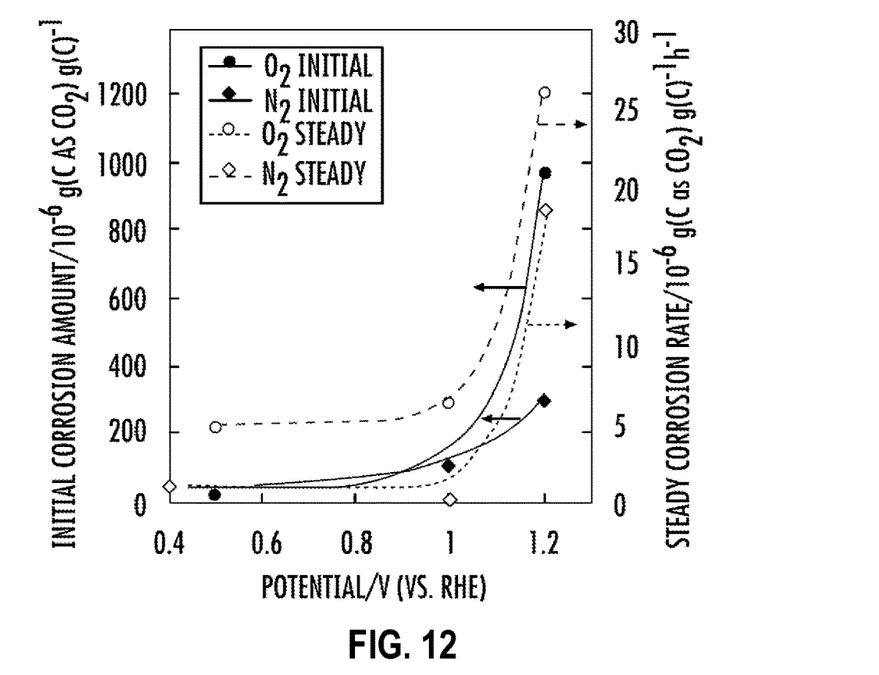
FIG. 12 is a graph of the occurrence of corrosion occurring versus voltage in a flow battery system.

FIGS. 11 and 12 illustrate measurements of the CO2 produced by the carbon corrosion reaction $C+2H_2O \rightarrow CO_2 + 4H^+ + 4e-$ in a three electrode test cell placed in aqueous sulfuric acid. The three electrodes were a dried carbon powder test electrode, a platinum wire counter electrode, and a platinum-black-plated foil reference electrode. These electrodes were placed in a heated aqueous solution of sulfuric acid for 48 hours. This assembly is electrochemically representative of many of the processes that occur in an operating flow battery. Corrosion tends to occur when the carbon in the electrode material reacts electrochemically with the water in the liquid electrolyte. This process removes material from the electrode surface and degrades the cell and the active electrochemical surface area. Furthermore, as the battery corrodes, the corrosion process produces CO2 gas in the battery system.

FIG. 11 shows an illustration of the corrosion of the test cell over time. As seen in FIG. 11, an area of initial corrosion 740 occurs generally between a CO2 concentration of 5 to 60 ppm g (carbon) before the corrosion stabilizes to a steady-state corrosion 742 of about 5 ppm g (carbon). FIG. 12 illustrates the initial corrosion amount against the potential across the interface of a flow battery membrane increases. It can be seen that the initial corrosion increases dramatically when the potential in the battery increases above 1 volt. Dependence on the local potential is what results in the corrosion process being sensitive to the formation of dead zones. In locations of the battery in which insufficient active material is available, the electrode potential may increase, dramatically increasing corrosion of the cell. Pulsing the flow of active materials through the battery to prevent dead zone formation reduces the corrosion, and therefore degradation, of the battery system.

Additionally, since dead zone conditions result in increased corrosion in the system, CO2 gas is produced in the system at an increased rate when the dead zones condition occurs. The CO2 typically travels to the Br2/HBr tank, where a CO2 sensor can detect the increased concentration of CO2 or the increased rate of CO2 production resulting from the dead zone. Thus, as discussed above, some embodiments of the battery system include a controller operably connected to a sensor that detects CO2 in the Br2/HBr tank, and the controller determines that a dead zone condition exists based upon the sensed concentration of CO2 or a time derivative of the CO2 concentration exceeding a predetermined threshold.

Figure 13:
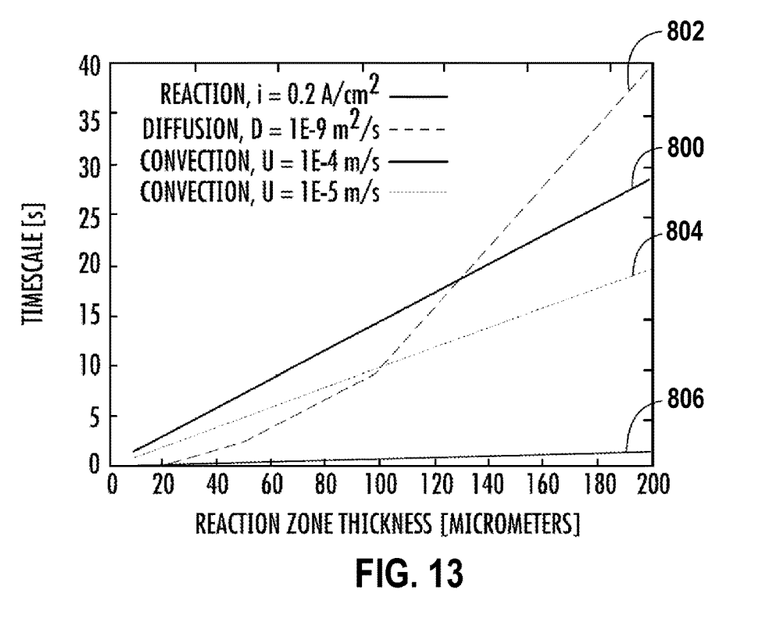
FIG. 13 is a graph of reaction, convection, and diffusion processes in an electrode on a liquid side of a flow battery system.

Two critical parameters examined in this disclosure are the timescales associated with dead zone formation and the relationship between convective transport rates and system pumping speed. FIG. 13 illustrates reaction, convection, and diffusion processes in an electrode on the liquid side of a flow battery system, illustrating representative timescales associated with the formation of a dead zone in the porous electrode on the liquid side of an H2/Br2 flow battery system. The reaction timescale approximates the time required to consume all of a 3M concentration of Br2 within a specified electrode volume. The timescales are calculated as a function of the characteristic length scale that describes the depth of the electrochemical reaction zone. The current density (I) 800, diffusivity (D) 802 and velocities (U) 804 and 806 that are used in the timescale calculations are labeled in the figure.

The timescales are calculated assuming a current density of i=0.2 A/cm2. As the assumed thickness of the reaction zone increases, this timescale increases linearly due to the linear increase in the available active material. The diffusion timescale is calculated using an approximate Br2 diffusivity of 1E-9 m2/s and the same reaction zone thickness. Convection timescales are shown for two different assumed velocities in a porous electrode. These velocities are relatively low, and would be expected to eventually induce the formation of dead zones.

FIG. 13 illustrates that a characteristic reaction time scale in a flow battery system ranges, in different embodiments, between a few seconds and thirty seconds. In flow batteries of other designs, this timescale spans an even wider range of values, since the timescales for development of dead zones is highly dependent on the geometry and design of the particular flow battery system. However, the reaction timescale does not by itself specify how often flow rates through the battery must be pulsed. A realistic value of the interval between flow pulses through the electrode might range from a few seconds to a few minutes. This interval is expected to be system and design specific. It can be seen from FIG. 13 that different pulsing flow methods can alter the time required for dead zone formation.

While the present disclosure describes an H2/Br2 flow battery, the reader should appreciate that the methods described herein are applicable to a wide class of flow battery systems that depend on active materials being transported into electrodes at sufficiently high rates.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following embodiments. The following embodiments are provided as examples and are not intended to be limiting.

The invention claimed is:

1. A flow battery system comprising:
   at least one cell;
   a first tank including a liquid electrolyte;
   a pump operably connected to the first tank and to the at least one cell;
   a second electrolyte tank operably connected to the at least one cell;
   a memory including program instructions stored therein;
   at least one sensor configured to detect carbon dioxide generated in the at least one cell, the at least one sensor further configured to generate at least one signal associated with the detected carbon dioxide; and
   a controller operably connected to the at least one sensor, the pump, and the memory and configured to execute the program instructions to:
   determine a dead zone condition exists based upon the at least one signal, and
   control the pump to pulse flow of the liquid electrolyte to the at least one cell based upon the determination.

2. The system of claim 1, further comprising
   a voltage sensor operably connected to the at least one cell.

3. The system of claim 1, wherein determining a dead zone condition exists comprises:
   determining that a carbon dioxide concentration exceeds a predetermined threshold.

4. The system of claim 1, wherein determining a dead zone condition exists comprises:
   determining that a time derivative of a carbon dioxide concentration exceeds a predetermined threshold.

5. The system of claim 1, wherein the $CO_2$ sensor is in fluid communication with the first tank.

6. The system of claim 1, wherein the at least one sensor further comprises a voltage sensor.

7. The system of claim 1, wherein the pulse flow comprises a reversal in the direction of flow of the liquid electrolyte.

8. The system of claim 1, wherein the pulse flow comprises a predetermined variation in flow rate at predetermined intervals.

9. A method of operating a flow battery system, comprising:
   generating, with at least one sensor, a carbon dioxide concentration signal associated with a sensed condition of detected carbon dioxide of a battery system having at least one cell, a first tank including a liquid electrolyte, and a second electrolyte tank operably connected to the at least one cell;
   determining, with a controller configured to execute programmed instructions stored in a memory, a dead zone condition exists in the battery system based upon the carbon dioxide concentration signal; and
   executing programmed instructions stored in the memory with the controller to control a pump operably connected to the first tank and to the at least one cell to pulse flow of the liquid electrolyte to the at least one cell based upon the determination.

10. The method of claim 9, further comprising
    generating a voltage signal with a voltage sensor operably connected to the at least one cell.

11. The method of claim 9, wherein determining a dead zone condition exists comprises:
    determining that the carbon dioxide concentration signal exceeds a predetermined threshold.

12. The method of claim 9, wherein determining a dead zone condition exists comprises:
    determining that a time derivative of the carbon dioxide concentration signal exceeds a predetermined threshold.

13. The method of claim 9, wherein the generating of the carbon dioxide concentration signal comprises:
    generating the carbon dioxide concentration signal corresponding to a carbon dioxide concentration in the first tank.

14. The method of claim 9, wherein the generating with the at least one sensor further comprises:
    generating a voltage signal with the voltage sensor.

15. The system of claim 9, wherein the controlling of the pump comprises:
    pulsing the flow by reversing the direction of flow of the liquid electrolyte.

16. The method of claim 9, wherein the controlling of the pump comprises:
 pulsing the flow with a predetermined variation in flow rate at predetermined intervals.

\* \* \* \* \*